Patented Oct. 11, 1932

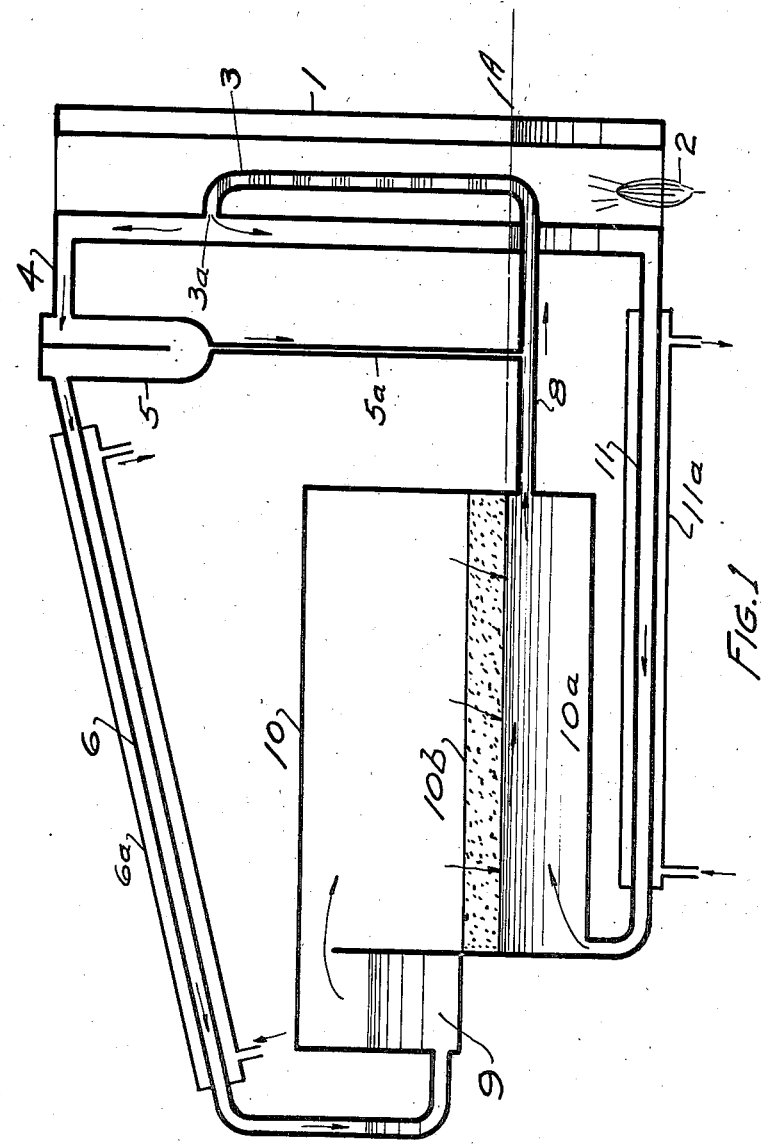

1,882,258

UNITED STATES PATENT OFFICE

BO FOLKE RANDEL, OF SAN DIEGO, CALIFORNIA

MEANS AND METHOD OF REFRIGERATION

Application filed September 10, 1930. Serial No. 480,916.

My invention relates to means and method of refrigeration and particularly to the absorption type employing an auxiliary agent for equalization of pressures.

In this type of apparatus as at present known in the arts a liquefied refrigerating agent is evaporated in the presence of an auxiliary agent diffusing into same, the mixture of the two agents then circulating together to an absorber, where a third absorption agent absorbs one of the two agents, thus separating same from each other.

It should be noted, first, that the refrigerating agent and the supplementary agent circulates together, circulation being caused by creating a head due to differences in specific weights; second, that the two agents are brought in contact with a third agent suitable to partially separate same by absorbing one of the two. Due to this fact an apparatus constructed to carry out the above known principle can not be very efficient.

First, the supplementary agent passes through alternative cooling and heating phases. In the evaporator this agent is cooled, thus taking away some of the cooling power of the cooling agent. In the absorber, this supplementary agent is heated, thus interfering with the efficiency.

Second, the heat generated in absorber must be removed, which lowers the thermal efficiency.

My invention, while embodying the principle of employing a supplementary agent for equalization of pressure in an evaporator, however, due to a difference of action, eliminates the above enumerated causes for low efficiencies. The supplementary agent does not circulate with the cooling agent and therefore does not undergo alternative phases of cooling and heating. The heat generated in the absorber is not removed, but is utilized in the generator to reduce the heat needed in this generator.

I do not diffuse a cooling agent into a supplementary agent and then circulate the mixture to separate same by absorption. I evaporate a liquefied cooling agent in the presence of the supplementary agent, pass the vaporized cooling agent through the supplementary vapor over to a point where the cooling agent is again absorbed. The supplementary agent is stationary in its place and does not circulate and is not separated by absorption. The supplementary agent may be likened to a cube of glass through which light rays are passing, these light rays being the cooling agent. The glass cube does not travel with the rays but remains in place stationary. The rays may be absorbed after passing through, without affecting the glass cube.

In Figure 1, I illustrate in diagrammatic form an apparatus suitable to carry out my method. The different parts are conventional and well known in the arts and detail description is not deemed necessary. Such parts are generator, which may be heated in any conventional manner, rectifier, condenser, etc., which may be constructed in many ways and be cooled in many manners. I include in my invention any and all constructions and arrangements of parts as will carry out my method.

In Figure 1, 1 is the generator, consisting of heater 2, and percolator element 2. Liquid in this percolator will be raised to high point 3a, and allowed to fill the receiver part of generator to level A.

Vapors generated will pass through pipe 4 to rectifier 5, which may be cooled by air or water. Assuming that liquid in generator is a solution of ammonia in water, ammonia vapor will separate from the water, these vapors passing through pipe 4, rectifier 5 into condenser 6. In rectifier any water vapor will be condensed, passing downwards through pipe 5a back to communication pipe 8.

The liquid in lower part of generator will now be weak solution, and by maintaining the temperature sufficiently high, this mixture may be nearly pure water.

From condenser 6, liquefied ammonia passes downwards into well or receiver 9, which is a part of evaporator 10. This evaporator is divided into two parts, the lower part 10a being separated from the upper part by a porous wall 10b. This porous wall acts as means of diffusing ammonia vapor from the upper part and into the liquid in the lower part. It also serves as a heat insulator between the two parts.

The upper part of evaporator is charged with a supplementary gas, non-condensable and insoluble in the liquid in the lower part. We may assume this gas to be hydrogen.

This gas is under a predetermined pressure, and as is seen, will remain permanently in the upper part of evaporator, as it is sealed from condenser and can not dissolve in the liquid below wall 10b.

This liquid is weak solution coming from generator 1, passing through cooler 11, which may be cooled by water as shown, or by air as desired. The weak solution then passes through lower part of evaporator, touching the porous division wall and causing ammonia vapor in the upper part to diffuse through wall to be absorbed in said liquid.

If it is assumed that a total pressure of 180 lbs. is maintained, and that the initial pressure of 150 lbs. is given the hydrogen gas in upper part of evaporator, then the ammonia gas will assume the balance, or 30 lbs. Any absorption of ammonia in the liquid below the division wall 10b will lower this pressure and cause further evaporation from liquid in well 9. The ammonia evaporated will pass through the hydrogen, which will remain stationary, thence diffuse through division wall to be absorbed in the weak solution. The heat of absorption is not removed, but the ammonia absorbed will be driven out by additional heat supplied in generator. If necessary, however, cooling of lower part of evaporator may be arranged for.

The division wall 10b will also act as a heat insulator, and the upper part of evaporator will be located in the refrigerator.

Having thus described my invention what I claim as new and desire to secure by Letters Patent is:

1. In a refrigerating apparatus of the class described, an evaporator and an absorber separated by a porous and permeable division wall, said evaporator being filled with a non-condensable gas and said absorber being connected with a circulating system permitting an absorption liquid inert to said non-condensable gas to circulate through, and a receiver for liquefied refrigerating agent connected with the said evaporator.

2. A method of refrigeration comprising evaporating a refrigerant, passing the vapors produced through a space filled with an inert supplementary gas and thence through a permeable membrane, then absorbing said vapors in an absorption medium.

3. A method of refrigeration comprising the creation of a pressure drop or a refrigerant through a permeable membrane by introducing an absorption medium to absorb said refrigerant causing a lowered pressure on said refrigerant on one side of the said membrane and evaporating said refrigerant in the presence of an inert pressure equalizing fluid.

4. Vaporizing a refrigerant, in the presence of an inert gas and creating a flow of said vapor through a permeable membrane by absorbing said vapor in an absorption liquid, thus causing a suction on said refrigerant through said membrane.

5. In a system of refrigeration having an evaporator and a separate absorber and employing an inert pressure equalizing medium, forcing a vaporized refrigerant through the said inert medium and thence through a permeable membrane from the evaporator to the absorber by creating a lowered partial pressure on said refrigerant in said absorber.

6. In a refrigerating apparatus of the absorption type, employing an inert pressure equalizing medium, an evaporator and an absorber, and a permeable division wall between said evaporator and said absorber, said permeable wall serving as a heat insulation, but permitting flow of refrigerant vapor from said evaporator to said absorber.

7. In a refrigerating apparatus, a permeable division wall separating an evaporator from an absorber, said division wall allowing passage of a refrigerant vapor from a higher partial pressure in the said evaporator to a lower partial pressure in said absorber, and an inert pressure equalizing gas in said evaporator.

8. A generator, a condenser, communication means between said generator and said condenser, an evaporator filled with an inert pressure equalizing medium, communication means between said condenser and said generator, an absorber, communication means between said generator and said absorber, a permeable membrane in said communication means between said evaporator and said absorber, means to transfer liquid from said generator to said absorber and other means to transfer liquid from said absorber to said generator.

9. Evaporating a liquid refrigerant in the presence of an auxiliary pressure equalizing gas causing a flow of said refrigerant vapor through a permeable wall by creating a pressure differential on each side of said wall in relation to the refrigerant but not in relation to the auxiliary gas, absorbing said refrigerant in an absorption medium, but not the auxiliary gas, applying heat to the solution formed, thus evaporating said refrigerant from said solution, condensing said evaporated refrigerant, returning said condensate to its point of beginning and returning the absorption liquid to its point of beginning thus completing the cycles.

In testimony whereof, I have hereunto set my hand at San Diego, California, this 6th day of September, 1930.

BO FOLKE RANDEL.